(12) United States Patent
Malik et al.

(10) Patent No.: US 7,039,564 B2
(45) Date of Patent: May 2, 2006

(54) METHOD OF REDUCING FINITE CONTROLLING AUTOMATA AND CORRESPONDING COMPUTER-READABLE MEDIUM

(75) Inventors: Robi Malik, Ingelheim (DE); Martin Witte, Kirchheim (DE)

(73) Assignee: Siemens Aktiengesellschaft, Munich (DE)

( * ) Notice: Subject to any disclaimer, the term of this patent is extended or adjusted under 35 U.S.C. 154(b) by 770 days.

(21) Appl. No.: 09/984,641

(22) Filed: Oct. 30, 2001

(65) Prior Publication Data

US 2002/0091984 A1 Jul. 11, 2002

(30) Foreign Application Priority Data

Oct. 30, 2000 (EP) ................................. 00123667

(51) Int. Cl.
*G06F 17/10* (2006.01)

(52) U.S. Cl. ............................... 703/2; 700/49; 706/60
(58) Field of Classification Search ................... 703/2; 706/10; 700/49; 716/5
See application file for complete search history.

(56) References Cited

U.S. PATENT DOCUMENTS 5,163,016 A * 11/1992 Har'El et al. .................. 716/5
5,963,447 A * 10/1999 Kohn et al. .................. 700/49
6,088,689 A *  7/2000 Kohn et al. .................. 706/10
6,256,598 B1 *  7/2001 Park et al. ...................... 703/2

FOREIGN PATENT DOCUMENTS

EP           0806735 A1    11/1997

OTHER PUBLICATIONS

Li, Y.-H. Hybrid Synthesis of Optimal Control for Discrete Eevent Systems, Proceedings of the 1933 IEEE International Symposium on Intelligent Control, Aug. 1993, pp. 308-313.*

Qui et al., R.G. A Structured Adaptive Supervisory Control Methodology for MOdeling the Control of a Discrete Event Manufacturing System, IEEE Transactions on Systems, Man, and Cybernetics, vol. 29, No. 6, Nov. 1999, pp. 573-586.*

Hashtrudi et al., Z.S. Fault Diagnosis in Discrete-Event Systems: Framework and Model Reduction, Proceedings of the 37th IEEE Conference on Decision and Control, Dec. 1998, pp. 3769-3774.*

Qui et al., R.G. Deterministic Finite Capacity Automata: A Solution to Reduce the Complexity of Modeling and Control of Automated Manufacturing Systems, Proc. of the 1996 IEEE Int. Sym. on Comp-Aided Control System Design, Sep. 1996, pp. 218-223.*

(Continued)

*Primary Examiner*—Russell Frejd
(74) *Attorney, Agent, or Firm*—Staas & Halsey LLP

(57) ABSTRACT

When the automatic controls of a number of small automata are synthesized to form large automata, the latter are often difficult to manipulate and for the most part cannot be represented graphically. In order to maintain the applicability of incremental verification techniques, the larger automata are reduced, in accordance with the invention. This is done by modeling the automata in a discrete event system DES and by eliminating from the DES all redundant state transitions, disallowed states, and unimportant selfloops. The novel method is most prominently applicable in control programs and distributed control system controllers.

16 Claims, 3 Drawing Sheets

Machine 1

Machine 2

Buffer

OTHER PUBLICATIONS

Malik et al., N. Automaton: An Automonous Coverage-Based Multiprocessor System Verification Environment, 8th IEEE Workshop on Rapid System Prototyping, Jun. 1997, pp. 168-172.*

Brandin et al., B, Incremental System Verification and Synthesis of Minimally Restrictive Behaviours, Proceedings of the 2000 American Control Conference, IEEE, vol. 6, Jun. 2000, pp. 4056-4061.*

Hubbard et al., "Initial Investigations of Hierarchical Supervisory Control for Multi-Agent Systems", Proceedings of the 38th Conference on Decision & Control, vol. 3, Jul. 12, 1999, Phoenix, Arizona USA, pp. 2218-2223.

Fabian et al., "Applying Supervisory Control Theory to Discrete Event Systems Modeled by Object Oriented Principles", Proceedings of the 1995 INRIA/IEEE Symposium on Emerging Technologies and Factory Automation, vol. 2, Oct. 10, 1995, pp. 93-104.

Ramadge et al., "The Control of Discrete Event Systems", Proceedings of the IEEE, vol. 77, No. 1, Jan. 1989, pp. 81-98.

Hubbard et al., "Initial Investigations of Hierarchical Supervisory Control for Multi-Agent Systems", Proceedings of the 38th Conference on Decision & Control, vol. 3, Jul. 12, 1999, Phoenix, Arizona USA, pp. 2218-2223.

Fabian et al., "Applying Supervisory Control Theory to Discrete Event Systems Modeled by Object Oriented Principles", Proceedings of the 1995 INRIA/IEEE Symposium on Emerging Technologies and Factory Automation, vol. 2, Oct. 10, 1995, pp. 93-104.

Ramadge et al., "The Control of Discrete Event Systems", Proceedings of the IEEE, vol. 77, No. 1, Jan. 1989, pp. 81-98.

* cited by examiner

METHOD OF REDUCING FINITE CONTROLLING AUTOMATA AND CORRESPONDING COMPUTER-READABLE MEDIUM

BACKGROUND OF THE INVENTION

Field of the Invention

The invention relates to a method for reducing finite controlling automata, to corresponding computer-readable media incorporating the method, and to a set of application programs and application program interfaces incorporating the method.

In the synthesis of automatic controls from many small automata, large automata occur which are difficult to manipulate and for the most part cannot be represented graphically. As a result, incremental verification techniques, in particular, are rendered difficult or impossible. At the same time, however, these automata contain a considerable amount of redundant information which is already contained in the initial automata. It is desirable to automatically reduce these automata.

In the prior art, it has been necessary to continue to work with the large automata and to dispense with graphical representations and incremental verification, or define by hand and without automatic support a small automaton which solves the synthesis problem.

SUMMARY OF THE INVENTION

It is accordingly an object of the invention to provide a system for reducing finite controlling automata, which overcomes the above-mentioned disadvantages of the heretofore-known devices and methods of this general type and which reduces large automata to a manageable degree and allows graphical representations and relatively simple definitions of otherwise highly complex automata and systems of automata.

With the foregoing and other objects in view there is provided, in accordance with the invention, a method of reducing a finite control automaton, which comprises:

modeling each of a plurality of primary automata in a primary discrete event system with system components including an event alphabet with a plurality of events, a state space with a plurality of states, an initial state, state transitions, and selfloops;

calculating a synchronous product of the primary automata to obtain a combined discrete event system;

defining, in the combined discrete event system, states with relevance in deciding whether a given event is allowed or forbidden and defining states without relevance;

removing the states without relevance and forming a partition of the state space containing the states with relevance; and eliminating all redundant state transitions and forming a reduced discrete event system.

In other words, the invention provides for a finite control automaton steps for simplifying finite automata. These automata are considered in the formal framework of discrete event systems. Background information and additional details, in this context, are described by Ramadge and Wonham, in "The Control of Discrete Event Systems," Proc. IEEE, Vol.77, No.1, January 1989, the disclosure of which is herewith incorporated by reference.

In formal terms, a Discrete Event System (DES) is a 5-tuple $G=(\Sigma,Q,q_0,\delta,Q_m)$, where:

$\Sigma$ denotes the alphabet of the events considered by the automaton.

Q denotes the set of the states of the automaton.

$q_0 \in Q$ denotes the initial state of the automaton.

$\delta: Q \times \Sigma \rightarrow Q$ denotes the state transition function of the automaton. This is a partial function which need not be defined for all pairs of state and event.

$Q_m \subseteq Q$ denotes the set of the marked (or terminal) states of the automaton.

DES can be illustrated as a figure in which the states of the discrete event system are used as nodes, and its events are used as edge inscriptions. In this case, an edge inscribed with an event σ exists between two states p and q precisely when the corresponding state transition is possible, that is to say, when $\delta(p,\sigma)=q$.

In graphical representation, the problem frequently arises that some events are possible in all states as so-called selfloops, that is to say it holds that $\delta(p,\sigma)=q$ for all states $q \in Q$. In a vast majority of useful applications of the system, the selfloops are of no impact or are entirely negligible. Accordingly, in order not to overload the graphical representation, we abide here by the convention that such edges can be omitted. More precisely, it is assumed here for each event $\sigma \in \Sigma$ which does not appear in the figure that the event is irrelevant for the described behavior, that is to say $\delta(p,\sigma)=q$ for all $q \in Q$.

Specific state transitions of a DES can be erased by synthesis algorithms, in order to prevent these transitions from occurring in a controlled system. We are interested in the automata arising in this way, since we wish to simplify them.

We denote a DES $G'=(\Sigma,Q,q_0,\delta',Q_m)$ which differs from the given DES G only in the state transition function as a limitation of G. We write $G' \leq G$, if only some state transitions in G' with respect to G have been erased, that is to say if, for all $q \in Q$ and all $\sigma \in \Sigma$ for which $\delta'(q,\sigma)$ is defined, it is also always the case that $\delta'(q,\sigma)=\delta(q,\sigma)$.

The objective is to use the automaton G' to control the behavior of G. This control comes about by virtue of the fact that, in specific states, G' exhibits the occurrence of specific events which are allowed in G, and in this way limits the system performance of G, in order to accomplish a specific control task. In this context, we also say for a given event $\sigma \in \Sigma$ and a given state $q \in Q$:

σ is allowed in q, if $\delta(q,\sigma)$ and $\delta'(q,\sigma)$ is defined;

σ is prohibited in q if $\delta(q,\sigma)$ is defined, but $\delta'(q,\sigma)$ is not defined;

σ is indifferent in q, if $\delta(q,\sigma)$ is not defined, that is to say if σ is neither allowed nor prohibited in q.

Describing complicated systems generally requires a plurality of DESs which describe a common behavior. For this purpose, the different components are combined by the operation of the synchronous product to form a single DES. Here, we make use as state space of the set of all tuples of states of the individual components, and a state transition with an event σ is possible in the product precisely when it is possible in each individual component.

Formally, the synchronous product is $G=G_1 \times \ldots \times G_n$ of the DES $G_1, \ldots, G_n$ where $G_i=(\Sigma,Q_i,q_{0,i},\delta_i,Q_{m,i})$ (with the common alphabet $\Sigma$) is defined as a DES $G=(\Sigma,Q,q_0,\delta,Q_m)$, in where $Q=Q_1 \times \ldots \times Q_n$;

$q_0=(q_{0,1}, \ldots, q_{0,n})$;

$\delta(q_1, \ldots, q_n, \sigma)=(\delta_1, \sigma), \ldots, \delta_n, \sigma))$, if $\delta_1(q_1,\sigma), \ldots, \delta_n(q_n,\sigma)$ are all defined; if $\delta_i(q_1,\sigma)$ is undefined for an i, $\delta(q_1, \ldots, q_n, \sigma)$ remains undefined;

$Q_m=Q_{m,1} \times \ldots \times Q_{m,n}$.

As noted above, the primary object here is to provide methods with the aid of which a complicated DES can be simplified. In accordance with an added feature of the invention, therefore, specific groups of states of the primary automaton are combined and replaced with a single state.

A possible approach for this purpose is based on a covering of the state space of the respective DES, that is to say on a system $C=\{P_1, \ldots, P_n\}$ of subsets $P_i \subseteq Q$ of the state space Q. A covering is required to cover the entire state space, that is to say $\cup_{i=1, \ldots, n} P_i = Q$. An interesting special case of a covering is the partition, in which it is additionally required that the subsets $P_i$ are all pairwise disjoint.

In accordance with an additional feature of the invention, therefore, the above-noted combining step comprises defining a covering of the state space of a respective discrete event system. Alternatively, the state space may be partitioned into equivalence classes and the covering may be formed as a partition from the equivalence classes.

The latter approach is based on an equivalence relation on the state set of the DES. It is known that an equivalence relation corresponds to the partition of the state space into its equivalence classes: for an equivalence relation $\sim \subseteq Q \times Q$ on the state set Q, the result is the partition $C=\{[q]|q \in Q\}$, in which case $[q]=\{q' \in Q|q' \sim q\}$ denotes the equivalence class of g with reference to $\sim$.

If a relationship $\sim \subseteq Q \times Q$ is given which is reflexive and symmetrical, but not transitive, we can still construct a covering therefrom. For this purpose, we make use as subset system of the set of all cliques, that is to say all maximum subsets of the state set Q whose elements are all related in pairs in accordance with $\sim$:

$C=\{P \subseteq Q | P$ is a maximum set, such that it holds for all $p,q \in P$ that $p \sim q\}$.

The first exemplary method described below is used to construct a simpler DES from a given covering of the state space by combining states. A variety of methods are possible, as described below, to calculate coverings suitable for a given DES and limitation thereof.

First we deal with the formation of a DES reduced with reference to a covering: Let there be given a covering $C=\{P_1, \ldots, P_n\}$ of the state set Q of a DES G. The DES, reduced with reference to C, is then formed with the states $P_1, \ldots, P_n$ in a first step. The edges connecting $P_i$ and $P_j$ are firstly all edges which lead from an element from $P_i$ to an element from $P_j$.

In a second step, all multiple edges, that is to say all edges with the same inscription from $P_i$ to $P_j$, are erased and replaced by a single edge.

Generally, the automaton yielded in this case can be nondeterministic, i.e. two edges with the same inscription but different end points can emanate from a $P_i$. In this case, $P_i$ has a nondeterministic state transition. Each such transition is made deterministic by deleting from this transition all but one edge. Each nondeterministic state transition therefore leads to a plurality of possible deterministic automata.

In accordance with another feature of the invention, we search for pairs of state tuples in each primary discrete event system and in each corresponding limited discrete event system where a given event is allowed in the primary discrete event system but forbidden in the corresponding limited discrete event system, and defining only those state spaces relevant in which the given event is allowed in the primary discrete event system and forbidden in the corresponding limited discrete event system.

With the above and other objects in view there is further provided, in accordance with the invention, a method of reducing a finite control automaton, which comprises:

modeling each of a plurality of primary automata in a primary discrete event system containing system components selected from the group consisting of an event alphabet with a plurality of events, a state space with a plurality of states, an initial state, state transitions, and selfloops;

determining a first set of states in which a given event is allowed and a second set of states in which the given event is prohibited;

calculating at least one set of prohibited pairs from the first and second sets;

if at least one set is not equivalent to a synchronous product of the respective state spaces, selecting an arbitrary pair of non-equivalent members of the first and second set of states and defining further pairs by forward-tracking edges between the defined states;

forming a covering of the state space of the discrete event system and replacing all multiple edges between states in the state space; and redefining the first and second sets, repeating the calculating step with the redefined first and second sets and forming a reduced discrete event system.

In accordance with a preferred mode of the invention, the set of prohibited pairs is iteratively calculated in a plurality of sets in a rising sequence of pairs.

In accordance with a further feature of the invention, the covering is formed as a partition of the state space, further pairs are added to the arbitrary pair in the forward tracking, and a transitive closure of a resulting relationship is added, and, if a forbidden pair is to be added, the arbitrary pair is dismissed and a new arbitrary pair is selected.

A synchronous product is particularly suitable in the formation of a reduced DES: Let there be given a DES $G=G_1 \times \ldots \times G_n$, which has resulted as a synchronous product from the components $G_1, \ldots, G_n$. Let there be given in addition a limitation $G' \leq G$ and an event $\sigma \in \Sigma$. The following method calculates a DES G" which exhibits with reference to the allowance or prohibition of the event $\sigma$ the same behavior as G', but which is simpler as a rule, that is to say has fewer states.

The first step for this purpose is to determine a partition of the state set $Q=Q_1 \times \ldots \times Q_n$ of G', from which a simpler automaton is formed with the aid of the covering method described above. The idea consists in deleting specific state components $Q_i$ which are irrelevant for determining whether the considered event $\sigma$ must be allowed or prohibited.

In a first step, check for each $i=1, \ldots, n$, whether there are two state tuples $q=(q_1, \ldots, q_{i-1}, q_i, q_{i+1}, \ldots, q_n)$ and $q'=(q_1, \ldots, q_{i-1}, q_i', q_{i+1}, \ldots, q_n)$ such that $\sigma$ is allowed in q but prohibited in q'. If such states exist, call $Q_i$ relevant, otherwise call $Q_i$ irrelevant. Relevant components are therefore precisely those on which the decision depends as to whether the event $\sigma$ is to be allowed or prohibited.

In a second step, let $j_1, \ldots, j_k$ be the indices of the state components identified in the first step as relevant. Then form a partition C of the state space as follows:

$$C = \{[q_{j_1}, \ldots, q_{j_k}] | q_{j_1} \in Q_{j_1}, \ldots, q_{j_k} \in Q_{j_k}\},$$

where $$[q_{j_1}, \ldots, q_{j_k}] = \{(x_1, \ldots, x_n) \in Q_1 \times \ldots \times Q_n | x_{j_1} = q_{j_1}, \ldots, x_{j_k} = q_{j_k}\}.$$

As a result, all irrelevant state components are removed in the new state space, and only tuples from relevant components are still considered.

In a third step, construct a reduced DES G" from G' with the aid of the above-covering method using the covering C obtained in the second step. This results in a well defined, deterministic automaton if the original automata $G_1, \ldots, G_n$ are deterministic.

A further method deals with combining states: Let there be given a DES $G=(\Sigma, Q, q_0, \delta, Q_m)$ as well as a limitation $G' \leq G$ and an event $\sigma \in \Sigma$. The following method calculates in stepwise fashion a DES G" which exhibits the same behavior as G' with reference to the allowance or prohibition of the event $\sigma$, but is simpler, as a rule. For this purpose, a relationship $\sim \subseteq Q \times Q$ on the state set Q from which it is possible to construct a reduced DES with the aid of the above covering method is determined in each step.

In a first step, determine the set A of the states in which the considered event $\sigma$ is allowed, and the set R of the states in which $\sigma$ is prohibited:

$$A = \{q \in Q | \sigma \text{ is allowed in } q\},$$

$$R = \{q \in Q | \sigma \text{ is prohibited in } q\}.$$

In a second step, calculate the set V of the prohibited pairs $(p,q) \in Q \times Q$ of states which are never allowed to be equivalent. This is calculated iteratively by a rising sequence $V_0, V_1, \ldots$ of sets of pairs. The relationship to be calculated is to have the property that no pairs of states can be related in which the critical event $\sigma$ is allowed in one state and prohibited in the other. Consequently, we define the initial set $V_0$ as $$V_0 = (A \times R) \cup (R \times A).$$

We calculate $V_{i+1}$ in the $i^{th}$ iteration by means of $$(BT) \quad V_{i+1} = V_i \cup \{(p,q) \in Q \times Q | \exists \tau \in \Sigma: (\delta'(p,\tau), \delta'(q,\tau)) \in V_i\}.$$

This rule is constructive, since it consists in the analysis of the state transitions described by an edge $\tau$. It consists of backward tracking (BT) along the edges: whenever the end states of two state transitions with the event $\tau$ are not permitted to be in one equivalence class, neither are the initial states.

The iteration ends when no more new pairs are found, and we then set $V := V_{l+1} = V_l$.

It is obvious that no further reduction is possible when $V = Q \times Q$, and the result of the method is the DES already calculated. Otherwise, in a third step, we select an arbitrary pair $$(p,q) \in (Q \times Q) \setminus V, \text{ wherein } p \neq q$$

and thereby define a new relationship $\sim \subseteq Q \times Q$ (specifically, the smallest reflexive and symmetrical relationship on Q which contains the pair (p,q)). Further pairs are subsequently defined by tracking the edges during the following "forward tracking" (FT):

(FT) If $p \sim q$ and for a $\tau \in \Sigma$ both $\delta'(p,\tau)$ and $\delta'(q,\tau)$ are defined, then track $\delta'(p,\tau) \sim \delta'(q,\tau)$.

It is not possible by applying this rule to define additional pairs which are prohibited, since it would follow from $(\delta'(p,\tau), \delta'(q,\tau)) \in V$ that $(p,q) \in V$. The relationship obtained is certainly reflective and symmetrical, but not necessarily transitive.

With the aid of cliques, for example, it is possible to use this relationship to construct a minimum covering. Using this covering C, we apply method 1 to our automaton G' in order to simplify it. If the covering is a partition, the construction yields a deterministic automaton, otherwise this is not guaranteed.

We now redetermine the sets A and R of the allowed and prohibited states:

$$A' = \{P \in C | P \cap A \neq \emptyset\},$$

$$R' = \{P \in C | P \cap R \neq \emptyset\}.$$

Finally, we set $A := A'$ and $R := R'$ and repeat the above second step using the reduced automaton G'.

As noted above, selfloops are typically of no import in the automaton and can, therefore, be eliminated. Selfloops which no longer play a role in accomplishing the control task frequently occur in automatically generated control graphs. Here we specify a method with the aid of which such superfluous selfloops can be deleted.

Let there be given a DES $G=(\Sigma, Q, q_0, \delta, Q_m)$ and an event $\sigma \in \Sigma$ to be considered. Then determine the set of all events irrelevant for the control; an event $\tau \neq \sigma$ a is irrelevant for the control when $\tau$ occurs in the figure only as a selfloop, that is to say when it always holds that $\delta(q,\tau) = q$ for all states $q \in Q$ in which the event $\tau$ is defined.

Construct thereby a simplified DES $G'=(\Sigma, Q, q_0, \delta', Q_m)$ in which irrelevant events are no longer considered, that is to say for all $q \in Q$ let $\delta'(q,\tau) = q$ for all irrelevant events $\tau \in \Sigma$, and $\delta'(q,\sigma) = \delta(q,\sigma)$ for all relevant events $\sigma \in \Sigma$.

Although the resulting automaton G' allows additional events with respect to G, it will exhibit the same behavior in connection with the original system as does G as well.

The process of combining states can be further specialized: When it is possible to produce a partition in the third step of the above combining method, this has the advantages that the method converges more quickly, and that the resulting automaton is guaranteed to be deterministic. This is ensured by the following modification of the method.

The relationship $\sim$ in the third step is changed as follows in the modified method: we select a non-prohibited pair $(p,q) \notin V$ and add further pairs in accordance with the forward tracking (FT). However, we also form the transitive closure of the relationship obtained in each step, that is to say when we add a pair (p',q'), we unite the relevant equivalence classes [p'] and [q'] (by adding further pairs). If this leads to the addition of a prohibited pair $(p',q') \in V$, we discard the originally considered pair: we set $V := V \cup \{(p,q)\}$ and begin step 3 again.

By means of this construction of the relationship $\sim$, we reliably obtain in each step an equivalence relation which also leads to a deterministic automaton. The method operates more quickly, because more pairs are added to $\sim$ in a step. The price for this is a poorer result in cases in which there is no good partition of the state space. However, it is still also possible to apply the original method to the result of the modified method in order to achieve further simplifications.

The foregoing can be further generalized with regard to the deletion of a plurality of events:

Let there be given once again a DES $G=(\Sigma, Q, q_0, \delta, Q_m)$ and a limitation $G' \leq G$. So far, we have considered only the case that G' differs from G only in the erasure of some edges which were all inscribed with the same event σ. We now generalize this, and consider all events $\sigma_1, \ldots, \sigma_k$ from which edges were erased in G' by comparison with G. There are two possible methods for this purpose, namely a one-dimensional method (successive deletion) and a multi-dimensional method (simultaneous deletion):

In the successive deletion, we apply for each $\sigma_j, j=1, \ldots, k$, one of the above methods on the DES G', and thereby respectively obtain a DES $G_j$ which has the correct behavior with reference to the control of the event $\sigma_j$. The simultaneous use of all graphs $G_1, \ldots, G_k$ thus obtained solves the problem for all required events.

In the simultaneous deletion, we apply one of the above methods mutatis mutandis simultaneously for all events to be deleted:

In the second method we operate, in principle, as in the one-dimensional method. However, a state component can be considered as irrelevant only when it is not required for any of the events considered. More precisely, we denote the component i as relevant when there are two state tuples $q=(q_1, \ldots, q_{i-1}, q_i, q_{i+1}, \ldots, q_n)$ and $q'=(q_1, \ldots, q_{i-1}, q_i', q_{i+1}, \ldots, q_n)$ such that one of the $\sigma_j$ is allowed in q and prohibited in q'.

In the first step of the third method, we determine separately the sets of the allowed and prohibited states for each event $\sigma_j$ considered:

$$A_j = \{q \in Q | \sigma_j \text{ is allowed in } q\},$$

$$R_j = \{q \in Q | \sigma_j \text{ is prohibited in } q\},$$

Subsequently, we calculate in the second step the initial set $V_0$ of the prohibited pairs in which we combine the prohibited pairs for all events considered:

$$V_0 = \cup_{j=1, \ldots, k} ((A_j \times R_j) \cup (R_j \times A_j)).$$

Likewise, the recalculation of the sets of the allowed and prohibited states at the end of the third step must be performed separately for each event $\sigma_j$:

$$A'_j = \{P \in C | P \cap A_j \neq \emptyset\},$$

$$R'_j = \{P \in C | P \cap R_j \neq \emptyset\}.$$

Otherwise, we proceed as in the one-dimensional method.

The above-outlined methods are preferably implemented in a computer program and the invention thus encompasses a computer-readable medium having computer-executable instructions for performing the above methods.

With the above and other objects in view there is also provided, in accordance with the invention, a set of application programs and application program interfaces embodied on a computer-readable medium for execution on a computer system in conjunction with an application program for combining and simplifying finite control automata, comprising:

a first interface for inputting data representing a plurality of primary automata in a system of related automata;

a processing stage for modeling each primary automaton as a primary discrete event system containing system components selected from the group consisting of an event alphabet with a plurality of events, a state space with a plurality of states, an initial state, state transitions, and selfloops;

a processing stage for calculating a synchronous product of the primary automata to obtain a combined discrete event system and for imposing limitations on the combined discrete event system to obtain a limited discrete event system;

a processing stage programmed to eliminate all forbidden states from the state space of the limited discrete event system, to eliminate all redundant state transitions from the limited discrete event system, and to form a reduced discrete event system; and a second interface for outputting a representation of the reduced discrete event system.

In accordance with a concomitant feature of the invention, the second interface is adapted to display the representation of the reduced discrete event system in graphical form.

Other features which are considered as characteristic for the invention are set forth in the appended claims.

Although the invention is illustrated and described herein as embodied in a method of reducing finite controlling automata, it is nevertheless not intended to be limited to the details shown, since various modifications and structural changes may be made therein without departing from the spirit of the invention and within the scope and range of equivalents of the claims.

The system of the invention, however, together with additional objects and advantages thereof will be best understood from the following description of the specific exemplary embodiment when read in connection with the accompanying drawings.

DESCRIPTION OF THE PREFERRED EMBODIMENTS

Figure 1:
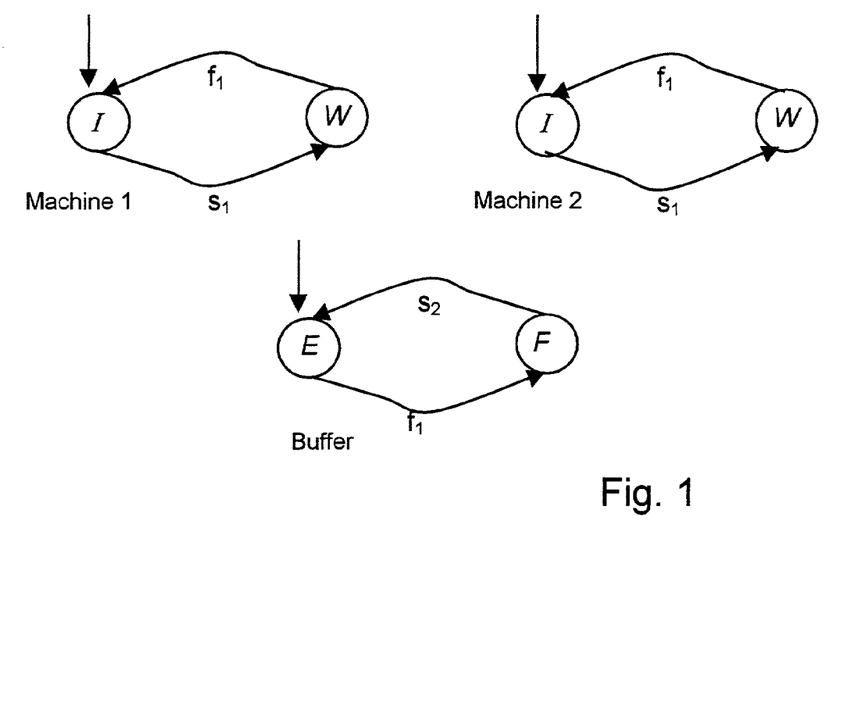
FIG. 1 is a graphical representation of an exemplary application of the method according to the invention.

Referring now to the various figures of the drawing in sequence and first, particularly, to FIG. 1 thereof, there is seen a graph of the classical example of a "small factory" without a breakdown and repair. See, Ramadge and Wonham, supra. The system comprises three separate element figures of which the first two each represent a machine, and the third represents a buffer with at most one element.

Figure 2:
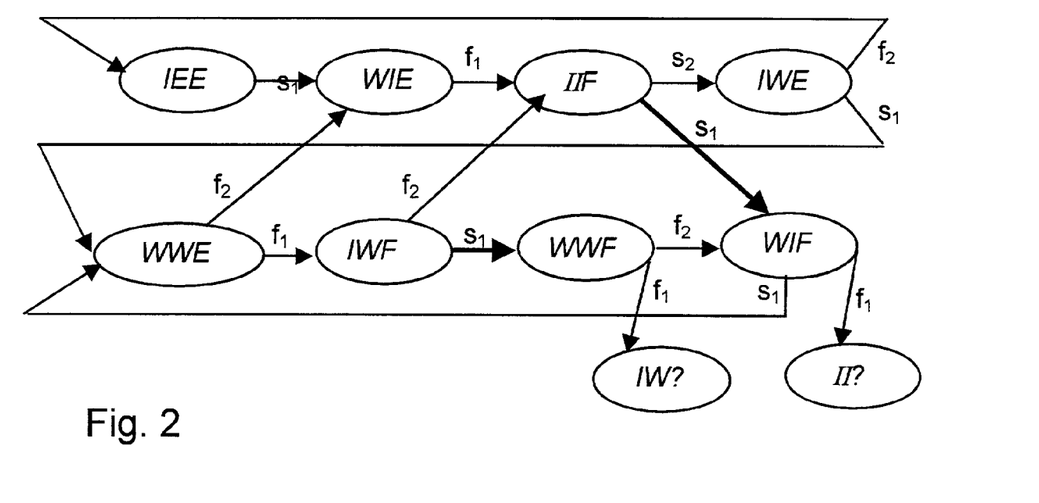
FIG. 2 is a graphical representation of a synchronous product figure derived by combining the three DES systems of FIG. 1.

These three automata are combined in the synchronous product G. The resulting system is uncontrollable: in states WWF and WIF, machine 1 can initiate an uncontrollable event $f_1$, although this is prohibited by the specification of the buffer. In order to prevent this, the two controllable edges labelled $s_1$, marked in bold, must be prohibited. As a result, the states WWF and WIF can no longer be reached and the edges can be eliminated. Consequently, by erasing the two edges and the states WWF and WIF, G is limited to the controlling automaton G'.

The control task of the automaton G' consists merely in prohibiting the critical event σ=s$_1$ in the two states IIF and IWF. This control, which still requires six states, can be simplified with the following process methods.

Method 2

In the first step, we check which of the three state components are relevant and which are irrelevant:

In order to check whether machine 1 is relevant, we consider all pairs of states in G' in which all state components agree apart from the state of machine 1. We find the pairs (IIE, WIE) and (IWE, WWE). Since σ=s$_1$ is allowed in IIE and IWE, and is indifferent in WIE and WWE, the two pairs may be combined. In other words, machine 1 is irrelevant.

We find the pairs (IIE, IWE), (WIE, WWE) and (IIF, IWF) for machine 2. Since here it is only states which have exactly the same properties with reference to the allowance or prohibition of s$_1$ that are combined, machine 2 is also irrelevant.

By contrast, the buffer is found to be relevant because s$_1$ is allowed in state IIE, while this event is prohibited in state IIF.

In the second step, we determine the covering C with which we limit the consideration to the state of the only relevant component, namely the buffer. We obtain C={[E],[F]}, wherein

[E]={IIE, WIE, WIE, WWE}, and

[F]={IIF, IWG}.

Figure 3:
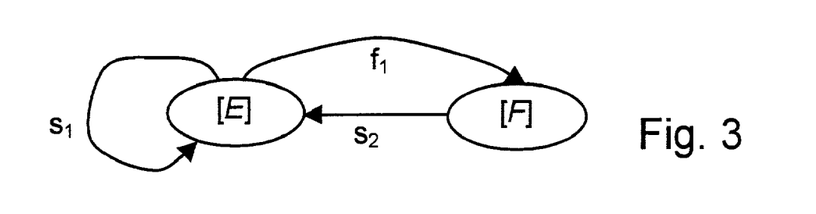
FIG. 3 is a graphical representation of a reduced automaton.

In the third step, finally, method 1 delivers the reduced automaton that is illustrated in FIG. 3.

Based on the above-introduced convention (self-loops with no impact can be eliminated), the selfloop f$_2$, which occurs in both states, is not illustrated in the figure. The selfloop s$_1$ in state [E] can, however, not be removed—even by using method 4—since it is the critical event.

Adding this automaton to the three original automata of machine 1, machine 2, and buffer results in a control which has the same performance as the substantially more complicated automaton G'. It even follows from this that it is possible when using this solution to remove the old figure of buffer, since the latter is subsumed by the new figure.

Method 3

The above definitions yield a first step as follows:

A={IIE, IWE};

R={IWF, IIF}.

In order to determine the set V of the prohibited pairs, in a second step we firstly initialize:

V$_0$=A×R={(IIE, IWF), (IIE, IIF), (IWE, IWF), (IWE, IIF)}

On reviewing V$_0$, it seen that only (IIE, IIF) has an incoming edge with the same inscription, namely f$_2$. This results in the tuple (IWE, IWF) which, however, is already contained in V$_0$. It follows that V=V$_0$.

In the third step, we select the pair (IIE, IWE) which is not contained in V, and thereby establish that IIE~IWE should hold. We denote the equivalence class thus defined by A={IIE, IWE}. On the basis of rule (FT), it follows with the event s$_i$ that WIE~WWE, and from this furthermore that IWF~IIF on the basis of the event f$_i$. We name the two resulting classes R={IWF, IIF} and I={WIE, WWE}. This results in the graph illustrated in FIG. 4.

Figure 4:
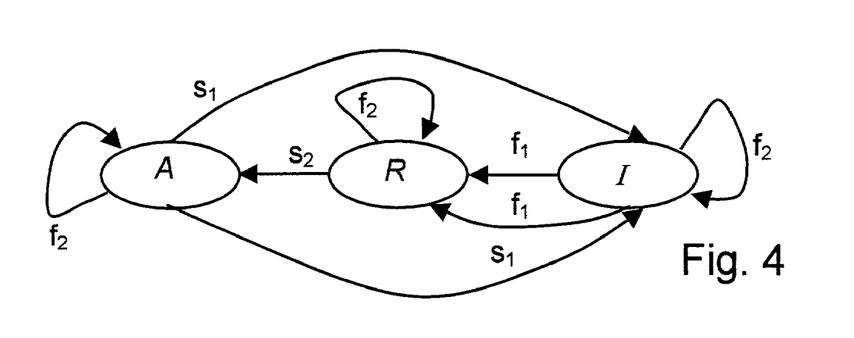
FIG. 4 is a graph of a system of equivalent and resulting classes with various edges and selfloops.
Figure 5:
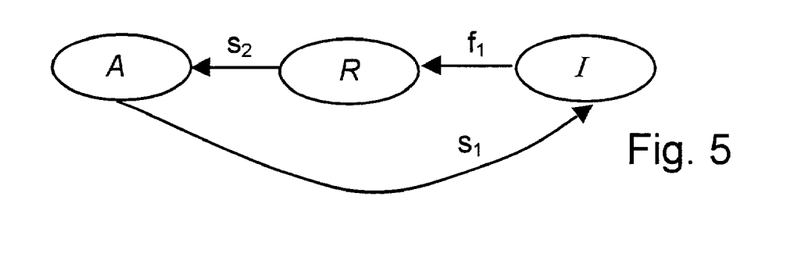
FIG. 5 is a graph of the system of FIG. 4 after the removal of various edges and selfloops.

Subjecting the system of FIG. 4 to the reducing methods 1 and 4 (deletion of multiple edges and selfloops), the simpler system of FIG. 5 results.

It should be noted that here the constructed sets of combined states are disjoint and therefore result in a deterministic automaton.

We now redefine:

A':={A}

R':={R}

V$_0$:A'×R'={(A,R)}

Since there are no more common edges, the immediate result in the second step of the method is:

V:=V$_0$.

Figure 6:
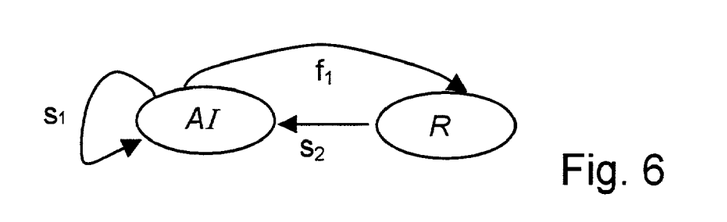
FIG. 6 is a graph of a system, essentially equivalent to the system of FIG. 3, that results by combining the states A and I of FIGS. 4 and 5 to a combined state AI.

If the pair (A,I) is now selected in the third step, the automaton shown in FIG. 6 is obtained after forming the union of these two states into one state AI. It is evident that the result illustrated in FIG. 6 corresponds to the result of the second method illustrated in FIG. 3.

Figure 7:
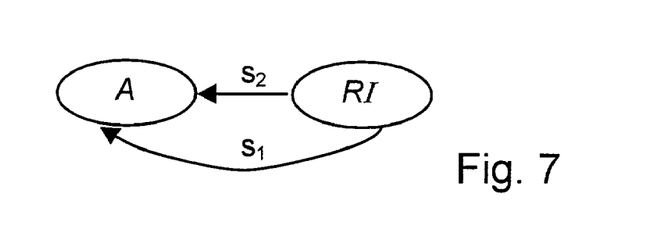
FIG. 7 is a graphical representation of an alternatively reduced automaton, in which the states R and I are combined to form a combined state RI.

If, by contrast, the pair (R,I) is selected in step 3, the alternative shown in FIG. 7 is obtained in accordance with method 4 after forming the union of these two states into one state RI and after deleting the selfloop f$_1$ in the new state RI.

This automaton also exhibits the same behavior in conjunction with the original three automata as the control G'. It must be noted, however, that the buffer—if it is used—cannot be removed from the plants.

The term "computer-readable medium," as used herein, should be broadly understood to include any kind of computer memory such as floppy disks, conventional hard disks, CD-ROMs, Flash ROMs, non-volatile ROM, RAM, and any real-time transfer between server and client application interfaces.

Figure 8:
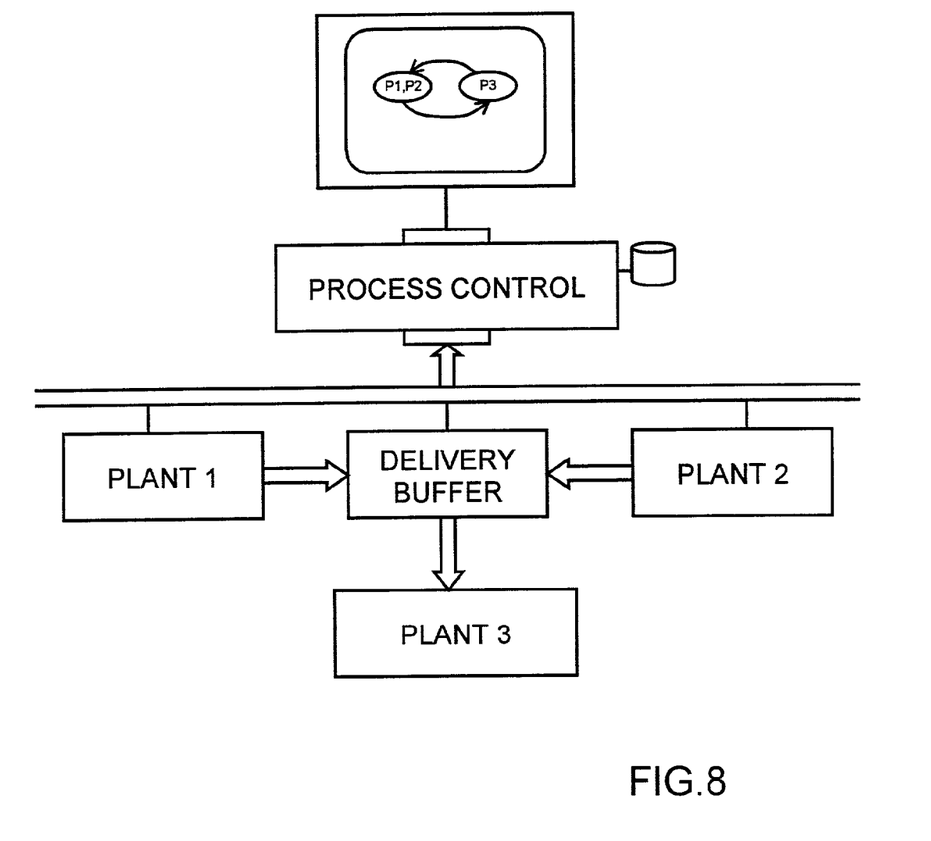
FIG. 8 is a representative diagram of a control system with synthesis and reduction of the control automata in the multi-machine context and with graphical display of the resulting reduced automaton.

Referring now to FIG. 8, there is shown a diagram of a control system that controls a simple manufacturing system with a plurality of unit plants, namely plant 1, plant 2, and plant 3. Plants 1 and 2 produce a preliminary component product which is supplied in JIT mode to a delivery buffer. From the buffer, the preliminary component product is supplied to plant 3 upon demand. Certain control limitations are placed on the individual automata (each of the machines and the buffer embody a separate automaton), such as, for example: (a) number of components N inside buffer cannot be greater than a defined integer number N$_{max}$; (b) plant 3 cannot take a component from the buffer when the number of components in the buffer is N<1; (c) plant 3 has priority of repair over plants 1 and 2. The automaton is modeled, in accordance with the invention, in a discrete event system DES which is expressed here as a 5-tuple G=(Σ,Q,q$_0$,δ,Q$_m$) . Some of the state transitions of the DES G can be immediately limited. The resulting limited DES is then formally referred to as G', with all of the components of the 5-tupel the same as in G, except with the changed δ'. The data signals representing the system are input into the processor, either directly or via intermediate sub-hierarchical processing systems in the manner of a distributed system. The processor, after properly reducing the automaton, displays the same via a display interface in graphical form. The plants and the process controller are interconnected via a system bus, and a computer memory device is diagrammatically indicated as a designated disk device.

We claim:

1. A computer-implemented method of manipulating a machine control process by reducing a finite control automaton, comprising:
   modeling each of a plurality of primary automata in a primary discrete event system containing system components selected from a group including an event alphabet with a plurality of events, a state space with a plurality of states, an initial state, state transitions, and self loops;
   calculating a synchronous product of the primary automata to obtain a combined discrete event system;
   defining, in the combined discrete event system, states with relevance in deciding whether a given event is allowed or forbidden and defining states without relevance;
   removing the states without relevance and forming a partition of the state space containing the states with relevance; and
   eliminating all redundant state transitions and forming a reduced discrete event system controlling the machine control process.

2. The computer-implemented method according to claim 1, further comprising combining groups of states of the primary automaton and replacing the groups of states with a single state.

3. The computer-implemented method according to claim 2, wherein said combining comprises defining a covering of the state space of a respective discrete event system.

4. The computer-implemented method according to claim 2, wherein said combining comprises partitioning the state space of a respective discrete event system into equivalence classes and forming a covering from the equivalence classes.

5. The computer-implemented method according to claim 1, further comprising eliminating all selfloops from the combined discrete event system.

6. The computer-implemented method according to claim 1, wherein said defining step comprises:
   searching for pairs of state tuples in each primary discrete event system and in each corresponding limited discrete event system where a given event is allowed in the primary discrete event system but forbidden in the corresponding limited discrete event system, and
   defining only those state spaces as relevant in which the given event is allowed in the primary discrete event system and forbidden in the corresponding limited discrete event system.

7. The computer-implemented method according to claim 1, wherein said eliminating enables a synchronous product automaton to control the machine control process in producing a desired manufactured product.

8. A computer-implemented method of reducing a finite control automaton, comprising:
   modeling each of a plurality of primary automata in a primary discrete event system containing system components selected from a group including an event alphabet with a plurality of events, a state space with a plurality of states, an initial state, state transitions, and selfloops;
   determining a first set of states in which a given event is allowed and a second set of states in which the given event is prohibited;
   calculating a third set of prohibited pairs from the first and second sets by an iterative back-tracking procedure;
   if the third set does not contain all possible pairs of states, selecting an arbitrary pair not contained in the third set and defining further pairs by forward-tracking edges between the states;
   forming a covering of the state space of the discrete event system;
   replacing all multiple edges between states in the state space;
   redefining the first and second sets;
   repeating said calculating using the first and second sets as redefined; and
   forming a reduced discrete event system to control a manufacturing control process producing a product.

9. The computer-implemented method according to claim 8, wherein the step of calculating the set of prohibited pairs comprises iteratively calculating a plurality of sets in a rising sequence of pairs.

10. The computer-implemented method according to claim 8, wherein said forming comprises:
    forming a partition of the state space;
    adding further pairs to the arbitrary pair in forward tracking;
    adding a transitive closure of a resulting relationship, and
    if a forbidden pair is to be added, dismissing the arbitrary pair and selecting a new arbitrary pair.

11. A computer-readable medium having computer-executable instructions for machine process control performing a method of reducing a finite control automaton, comprising:
    modeling each of a plurality of primary automata in a primary discrete event system containing system components selected from a group including an event alphabet with a plurality of events, a state space with a plurality of states, an initial state, state transitions, and self loops;
    calculating a synchronous product of the primary automata to obtain a combined discrete event system;
    defining, in the combined discrete event system, states with relevance in deciding whether a given event is allowed or forbidden and defining states without relevance;
    removing the states without relevance and forming a partition of the state space containing the states with relevance; and
    eliminating all redundant state transitions and forming a reduced discrete event system enabling the primary automata to control the machine process in producing a desired product.

12. A computer-readable medium having computer-executable instructions embodied in a manufacturing process control computer system for performing a method comprising:
    modeling each of a plurality of primary automata in a primary discrete event system containing system components selected from a group including an event alphabet with a plurality of events, a state space with a plurality of states, an initial state, state transitions, and selfloops controlling the manufacturing process control computer system;
    determining a first set of states in which a given event is allowed and a second set of states in which the given event is prohibited;
    calculating a third set of prohibited pairs from the first and second sets by an iterative back-tracking procedure;

if the third set does not contain all possible pairs of states, selecting an arbitrary pair not contained in the third set and defining further pairs by forward-tracking edges between the states;

forming a covering of the state space of the discrete event system;

replacing all multiple edges between states in the state space;

redefining the first and second sets;

repeating said calculating using the first and second sets as redefined; and forming a reduced discrete event system.

13. A computer-readable medium embodying a set of application programs and application program interfaces for execution on a manufacturing process control computer system in conjunction with an application program for combining and simplifying finite control automata, comprising:

a first interface for inputting data representing a plurality of primary automata in a system of related automata for controlling the manufacturing process control computer system;

a processing stage for modeling each primary automaton as a primary discrete event system containing system components selected from the group consisting of an event alphabet with a plurality of events, a state space with a plurality of states, an initial state, state transitions, and selfloops;

a processing stage for calculating a synchronous product of the primary automata to obtain a combined discrete event system and for imposing limitations on the combined discrete event system to obtain a limited discrete event system;

a processing stage programmed to eliminate all forbidden states from the state space of the limited discrete event system, to eliminate all redundant state transitions from the limited discrete event system, and to form a reduced discrete event system; and a second interface for outputting a representation of the reduced discrete event system.

14. The application program interface according to claim 13, wherein said second interface is adapted to display the representation of the reduced discrete event system in graphical form.

15. A computer system for forming a reduced discrete event system, comprising:

at least one input unit to input models of a plurality of primary automata in a primary discrete event system containing system components selected from a group including an event alphabet with a plurality of events, a state space with a plurality of states, an initial state, state transitions, and self loops; and a processor to calculate a synchronous product of the primary automata to obtain a combined discrete event system, to define, in the combined discrete event system, states with relevance in deciding whether a given event is allowed or forbidden and states without relevance, to remove the states without relevance, to form a partition of the state space containing the states with relevance, and to eliminate all redundant state transitions in forming the reduced discrete event system.

16. The computer system according to claim 15, wherein said computer system is connected to a manufacturing system, and wherein said computer system further comprises an output unit, coupled to said processor and the manufacturing system, issuing control instructions to the manufacturing system to produce a desired manufactured product based on the reduced discrete event system.

* * * * *